(12) United States Patent
Boman et al.

(10) Patent No.: US 8,621,582 B2
(45) Date of Patent: Dec. 31, 2013

(54) AUTHENTICATION SYSTEM

(75) Inventors: Krister Boman, Molndal (SE); Gunnar Rydnell, Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1851 days.

(21) Appl. No.: 11/568,660

(22) PCT Filed: May 12, 2004

(86) PCT No.: PCT/EP2004/005107
§ 371 (c)(1),
(2), (4) Date: Nov. 3, 2006

(87) PCT Pub. No.: WO2005/109938
PCT Pub. Date: Nov. 17, 2005

(65) Prior Publication Data
US 2007/0274522 A1    Nov. 29, 2007

(51) Int. Cl.
*G06F 21/00* (2006.01)
(52) U.S. Cl.
USPC ............... 726/6; 713/155; 713/156; 709/205; 709/206; 370/352; 380/247
(58) Field of Classification Search
USPC .......................................................... 726/6
See application file for complete search history.

(56) References Cited

U.S. PATENT DOCUMENTS

| | | | | |
|---|---|---|---|---|
| 5,809,141 | A * | 9/1998 | Dent et al. | 380/247 |
| 6,400,812 | B1 * | 6/2002 | Svedberg et al. | 379/114.14 |
| 7,418,596 | B1 * | 8/2008 | Carroll et al. | 713/169 |
| 8,045,530 | B2 * | 10/2011 | Haverinen et al. | 370/338 |
| 2001/0001268 | A1 * | 5/2001 | Menon et al. | 370/329 |
| 2002/0009199 | A1 * | 1/2002 | Ala-Laurila et al. | 380/247 |
| 2002/0099775 | A1 * | 7/2002 | Gupta et al. | 709/205 |
| 2003/0039237 | A1 | 2/2003 | Forslow | |
| 2003/0226037 | A1 * | 12/2003 | Mak | 713/201 |
| 2004/0223489 | A1 * | 11/2004 | Rotsten et al. | 370/352 |
| 2004/0225878 | A1 * | 11/2004 | Costa-Requena et al. | 713/150 |
| 2004/0243835 | A1 * | 12/2004 | Terzis et al. | 713/200 |
| 2005/0026558 | A1 * | 2/2005 | Stura et al. | 455/3.06 |
| 2007/0005501 | A1 * | 1/2007 | Foll et al. | 705/52 |

FOREIGN PATENT DOCUMENTS

WO    WO 02/096026 A    11/2002
WO    WO 03/081856 A    10/2003

OTHER PUBLICATIONS

Pashalidis et al. "Using GSM/UMTS for Single Sign-On", IEEE, Oct. 26, 2003, pp. 138-145.*
Accountable anonymous access to services in mobile communication systems|http://ieeexplore.ieee.org/stamp/stamp.jsp?tp=&arnumber=805128| Butty'an et al.|1999|pp. 6.*
Pashalidis A et al, "Using GSM/UMTS for single sign-on" IEEE, Oct. 26, 2003, pp. 138-145, XP010670965.
Metz Christopher, "AAA Protocols: Authentication, Authorization, and Accounting for the Internet" IEEE Internet Computing, IEEE Service Center, Piscataway NJ US 1999, pp. 75-79, XP002176948 ISSN 1089-7801.
"Generic Authentication Architecture (GAA); Generic Bootstrapping Architecture" 3GPP TSG SA WG3 Security, Online! Feb. 1, 2004-Feb. 13, 2004 p. 09-02-2004, XP002293950 Edinburgh Scotland UK.

* cited by examiner

*Primary Examiner* — Mahfuzur Rahman

(57) ABSTRACT

Methods, interface, and a communication network in a 3GPP network are presented. A user is authenticated and application service rules are binded to the user in GGSN filters ensuring that the correct charging, QoS level or similar function rules apply to the user for specific application services available from both external application service providers and network operator supplied specific services.

5 Claims, 3 Drawing Sheets

AUTHENTICATION SYSTEM

FIELD OF THE INVENTION

The present invention relates to services and authentication in a packet based telecommunication network, and in particular integration of application services and user authentication functions in a 3GPP network.

BACKGROUND OF THE INVENTION

In the standardization of 3GPP (Third Generation Partnership Project) there is on going work to standardize user authentication routines, especially for the so called Generic Authentication Architecture (GAA) involving a mutual authentication between a client and an application server. In the communication network several different applications will be available for the client and these applications will be supplied by third party suppliers, i.e. different from the Service Provider (SP). However, a client accessing several different applications would like to make only one single authentication, a so called Single Sign On (SSO) service, providing the possibility for the user to only authenticate once during a session, rather than to authenticate to each new application server it wants to use. This will make the authentication procedure much easier for the client. Also this kind of authentication service can be offered to third party application service providers as a service from the Service Provider handling the network. The GAA is aiming for solving this problem and making such a service available in the 3GPP network. The generic authentication provides an authentication of the users on an application level based on the proven security mechanism in the Public Land Mobile Network (PLMN).

The GAA is specified through the 3GPP group and drafts of the specification may be obtained through their web site, for instance the documents TS 32.220 and TR 33.919 maybe mentioned as good starting points regarding GAA. The GAA system may be explained as follows: A number of applications share a need for mutual authentication between a client/user (called UE, User Equipment, in the standard) and an Application Server (AS) in order to allow for further communication. This is necessary when the user wants to access servers demanding authentication, e.g. content servers charging for their services, certificate demanding web sites (e.g. banks), and similar application servers. Since many applications share the same need, it has been considered to specify a Generic Authentication Architecture (GAA), providing the architecture for allowing application servers access to the infrastructure authentication systems. Thus, if the application server trusts the service provider, this architecture may simplify the authentication schemes both for the user and for the application servers. The user needs only to authenticate once during a session, rather than authenticating towards every application server accessed.

In a GAA based session the user authenticates with the network infrastructure by providing an ID to a Bootstrap Function (BSF), this ID may for instance consist of the UE IMSI number (International Mobile Subscriber Identifier), which is a unique number coupled identifying a user. The IMSI is relayed to the Home Subscriber System (HSS, also called Home location register system) and the HSS provides an Authentication Vector (AV) to the BSF. The BSF authenticates the UE based on the USIM (Universal Subscriber Identity Module) and the UMTS-AKA methods, and sends a TID (Transaction Identifier) to the UE.

Also at the same time, work is on going to standardize so called Flow Based Charging (FBC). FBC has the aim to make it possible to charge users for service usage on a finer granularity than what is possible today. For instance it is of interest to identify the type of IP session that a user is running, the type of applications involved and so on. For instance one would like to be able to differentiate the charging costs for different types of services, e.g. streaming video may be charged more than exchanging plain text messages like simple email messages. There are many different services that may be used including both user to user and user to network services. Service data flows from these services may be identified and charged in many different ways. The FBC method is used to set up charging filters that is used by the CRF (Charging Rules Function) for different applications.

The filters provided in the FBC method can be quite complex and may involve source and destination address, source and destination port number, and transaction protocol, enabling a fine granularity of charging. Charging models requiring even more complex data may use special filters that look further into data packets and may be defined by the TPF (Traffic Plane Function) and invoked by the CRF.

However, the above-mentioned two standardization works are not today aiming for an integration of the services they provide. This will in the future be crucial in order to be able to provide differentiated charging rules depending on the user and application connected to and at the same time ensuring the authenticity of the user towards the specific application server involved in the transaction. It should not be possible to, by only providing a fake IP number, getting access to services intended for other users or obtaining services at a wrong charging rate.

The work in 3GPP on GAA and FBC has been so far performed in parallel, and there is no concern taken to reuse functionality between the two functions. At some stage in standardization, interoperability between GAA and FBC needs to be built in. An integrated architecture will be necessary.

Specifically, the problem of supporting user specific charging for GAA authenticated users is not solved in FBC. The problem may be exemplified as follows:

1. A service provider has an application server providing a service, e.g. downloading a music file. This service is accessible for mobile users via the GPRS access network on the Gi interface. GAA ensures that the user is authenticated.
2. When the user downloads a music clip, he is charged by volume because the GGSN performs byte counting on the packets downloaded, and reports CDRs to the billing system. FBC can be used to enable that a specific rating is applied to the downloaded music file. FBC provides filtering in the GGSN that counts the specified service individually.
3. Now, the service provider might at some point provide the service for a special price for some users. In that case, it is needed to provide a specific filter for individual users. How that can be done is not specified today.

In another standardization implementation, work is on going regarding policy decision functions such as the PDF (Policy Decision Function) for policy control of IP bearer resources, such as Quality of Service (QoS) for a specific user. Policy Decision Function relates a level of Quality of Service to a specific user and instant in time, enabling for instance a better Quality of Service for a certain type of application such as streaming video applications, or for a customer prepared to pay more for a higher quality of connectivity. It would be efficient to incorporate the PDF function with the GAA function in order to implement a more efficient network system.

SUMMARY OF THE INVENTION

The object of the preferred embodiment of the present invention is to eliminate the above mentioned drawbacks with the current standardizations and provide more efficient use of the network functions in order to give the end user a better networking quality. This is done by letting a Generic Authentication Architecture (GAA) function govern the behavior of several functions concerning the network connectivity for a specific user.

These functions involve both differentiated charging procedures and differentiated policy control of IP bearer resources, such as Quality of Service (QoS) of communication link.

The differentiated charging procedure enables Service Providers (SP) to charge different users different rates and change pricing depending on service required and time of usage or amount of usage.

The preferred embodiment of the present invention ensures that there is a binding between the authenticated user and the charging rules and/or policy control services, such as Quality of Service rules for that specific user.

In a preferred embodiment of the present invention, a method for binding service functions in a telecommunication network to a standard authentication function is provided. Preferably, the method comprises the following steps:
1. sending a user IP number and user IMSI number to an authentication proxy;
2. authenticating the user according to a standardized Generic Authentication Architecture (GAA) method;
3. sending authentication data to a service requested by said user;
4. sending service rules for the specific user to a Gateway GPRS Support Node (GGSN).

The method is further exemplified by that the service rules may be a Charging Rules Function (CRF) and/or a Policy Decision Function (PDF). A user may be defined as an individual user or part of an MBMS (Multimedia Broadcast Multicast Service) session using an IP multicast address.

In another preferred embodiment, a communication interface in a 3GPP network is provided, wherein authentication data is transmitted between an authentication service, such as an Authentication Proxy (AP) and a service rules function and user specific service rules are transmitted between the AP and an application server (AS), ensuring the authenticity of the user towards the application service. The service rules may be a Charging Rules Function (CRF) and/or a Policy Decision Function (PDF).

In yet another preferred embodiment, a signaling method in a 3GPP network is provided, comprising the steps of:
authenticating a user (UE) according to a Generic Authentication Architecture (GAA) method;
signaling to an application server (AS) to access the service provided by the application server (AS);
identifying the user (UE) in the application server (AS);
transmitting user specific service rules to an authentication service, such as an authentication proxy (AP);
transmitting from the (AP) user specific service rules to appropriate service rules function or functions within 3GPP network; and
transmitting user specific service rules from the service rules function to a communication support node, such as a Gateway GPRS Serving Node (GGSN).

In the signaling method the service rules function may comprise a Charging Rules Function (CRF) and/or a Policy Decision Function (PDF). A user may be an individual user or part of an MBMS (Multimedia Broadcast Multicast Service) session using an IP multicast address.

Another preferred embodiment of the present invention provides a packet based wireless communication network, such as a 3GPP communication network, capable of handling an equipment (UE) of a user, the network comprising:
a communication support node, such as a Gateway GPRS Serving Node (GGSN);
an authentication service, such as an Authentication Proxy (AP);
at least one Application Server (AS);
wherein the user is authenticated using a Generic Authentication Architecture method (GAA), the user is identified in the AS and the AS provide the AP with user specific service rules, the AP transmits the user specific service rules to an appropriate service rules function within the 3GPP network and the appropriate service rules function transmits user specific service rules to the GGSN.

In the communication network, the service rules function may comprise a Charging Rules Function (CRF) and/or a Policy Decision Function (PDF). Also a user may be an individual user or part of an MBMS (Multimedia Broadcast Multicast Service) session using an IP multicast address.

In yet another preferred embodiment of the present invention, a communication protocol exchange method in a packet based wireless communication network, such as a 3GPP network, is provided, wherein the protocol comprises the steps of:
sending a user IP number and user identification number to an authentication service, such as an authentication proxy (AP);
authenticating the user according to a Generic Authentication Architecture (GAA) method;
sending authentication data to a service requested by the user;
sending service rules for the specific user to a communication support node, such as a Gateway GPRS Support Node (GGSN).

The user identification number may preferably be an IMSI number provided in a standard 3GPP network, and the service rules function may comprise a Charging Rules Function (CRF) and/or a Policy Decision Function (PDF).

In another preferred embodiment of the present invention, a billing method in a packet based wireless communication network is provided, the billing method comprising:
authenticating a user according to a Generic Authentication Architecture (GAA) method;
signaling to an application server (AS) to access the service provided by the application server (AS);
identifying the user (UE) in the application server (AS);
transmitting user specific charging rules to an authentication service;
transmitting from the authentication service user specific charging rules to charging rules function or functions within the network;
transmitting user specific charging rules from the charging rules function to appropriate communication support node; and
billing user for usage according to the charging rules.

The network in the above mentioned billing method may be a 3GPP network

The communication support node may be a Gateway GPRS Serving Node (GGSN). Authentication service may be an Authentication Proxy (AP) and the charging rules function may be a Charging Rules Function (CRF) according to the 3GPP standardization.

In yet another preferred embodiment of the present invention, an instruction set for binding service functions in the above mentioned communication network to an authentication function is provided, the instruction set comprises:
- a procedure for sending a user IP number and user identification number to an authentication service;
- a procedure for authenticating the user according to a Generic Authentication Architecture (GAA) method;
- a procedure for sending authentication data to a service requested by the user; and
- a procedure for sending service rules for the specific user to a communication support node.

To further enhance the applicability of the instruction set embodiment the user identification number may be an IMSI number, the authentication service may be an Authentication Proxy (AP), and the communication support node may be a Gateway GPRS Support Node (GGSN).

In another preferred embodiment of the present invention, an application server for use in a packet based wireless communication network is provided, the application server comprising:
- a memory unit, said memory unit being provided to store above mentioned instruction sets;
- a processing unit being provided for handling the instruction set; and
- a communication unit being provided for handling communication with nodes and units in said network.

BRIEF DESCRIPTION OF THE DRAWINGS

In the following, the invention will be described in a non-limiting way and in more detail with reference to exemplary embodiments illustrated in the enclosed drawings, in which.

DETAILED DESCRIPTION OF THE INVENTION

The different functional components involved has been specified in the literature, for instance at the 3GPP official standardization forum. However, a brief description of the most relevant components will be given here in order to give a better understanding of the interconnection between them in the present invention.

Figure 1:
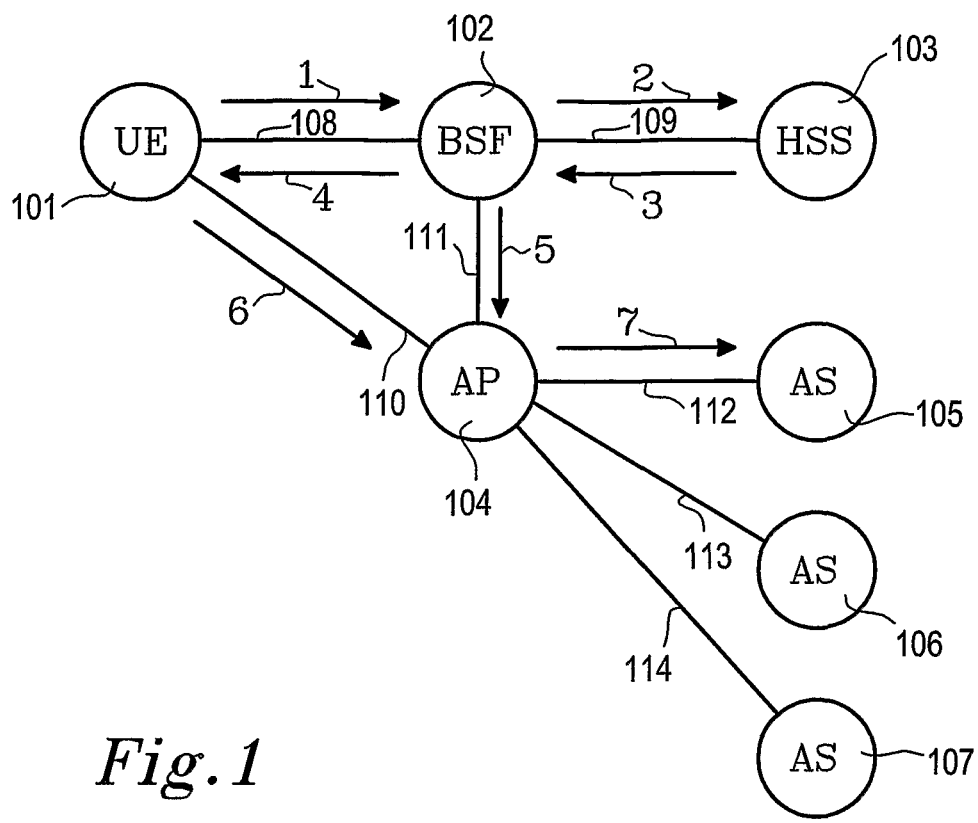
FIG. 1 shows a schematic block diagram over an authentication scheme according to GAA.

Relating to FIG. 1, wherein the standard Generic Authentication Architecture (GAA) method is schematically shown, A user 101 (UE) has an interest to contact an Application Server 105, 106, and 107 in order to obtain a service from the network provider or a third party service provider (105, 106, 107). The procedure in the current standardization (as of version 1.2.1 of 3GPP TS 33.220) has the following architecture (where the step numbering also depicts the procedure number in order):

1. UE 101 sends identification (ID) credentials (e.g. International Mobile Station Identity number: IMSI) to a Bootstrap Function (BSF) 102.
2. The BSF 102 sends the ID to a Home Subscriber System (HSS) 103.
3. The HSS 103 provides an Authentication Vector (AV) to the BSF 102.
4. The BSF 102 authenticates the UE 101 based on USIM (Universal Subscriber Identity Module) and UMTS-AKA (Universal Mobile Telecommunication System—Authentication and Key Agreement) methods and sends a Transaction Identifier (TID) to the UE 101.
5. The BSF 102 sends the TID together with IMSI, password (PWD) and a list of Public User IDs (e.g. George@vfe.com or similar) to an Authentication Proxy (AP) 104 and further to an Application Server (AS) 105, 106, and 107
6. The UE 101 sends the TID together with password (PWD), relevant user IDs (e.g. IMSI), Public User ID (one or more) and IMSI to the AP 104. The AP 104 matches the PWD and the IMSI received in the corresponding TID from the BSF 102 and concludes if the UE 101 is authenticated. The provided public user ID is accepted if it is included in the list received from the BSF 102.
7. The Public User ID is used towards the AS 105, 106, and 107 to access the wanted service.

Preferably, the application server comprises a memory for storing instructions, a processor for processing (instruction) data and communication interface.

Figure 2:
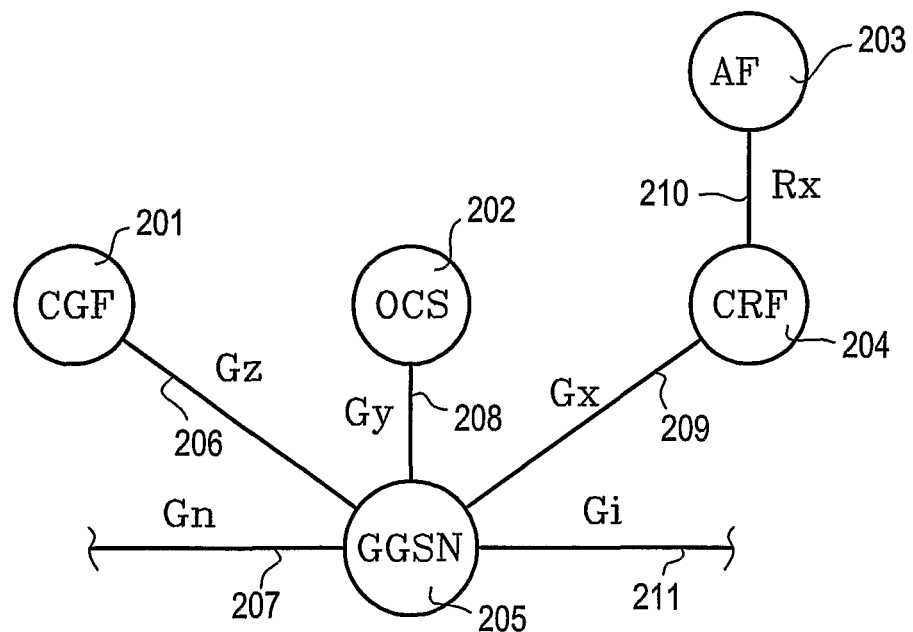
FIG. 2 shows a schematic block diagram over flow based charging according to the current standardization.

In a Flow Based Charging model the following nodes are involved as can be seen in FIG. 2:

GGSN 205: The traffic Plane Function (TPF) in the GGSN counts and reports IP flow packets according to the flows defined in the IP flow filter.

A Charging Rules Function (CRF) 204 provides charging rules, including IP flow filters to the GGSN over the interface Gx 209. The filters may be dynamically received from an Application Function (AF) 203 over Rx reference point 210.

A Charging Gateway Function (CGF) 201 receives Charging Data Records (CDRs) from the GGSN 205 for off line charging over Gz 206 interface.

An Online Charging System (OCS) 202 provides rating and credit service, in case of on line charging, to the GGSN over Gy 208 interface.

The Policy Decision Function procedure involves the GGSN 205 which communicates with the PDF over Go interface and a specific application function communicates with the PDF using Gq interface. The gateway resources are used by the application function in order to provide a service based policy control. In conjunction with FIG. 2, the PDF may be illustrated with the architectural position 204 for the current standard.

Figure 3:
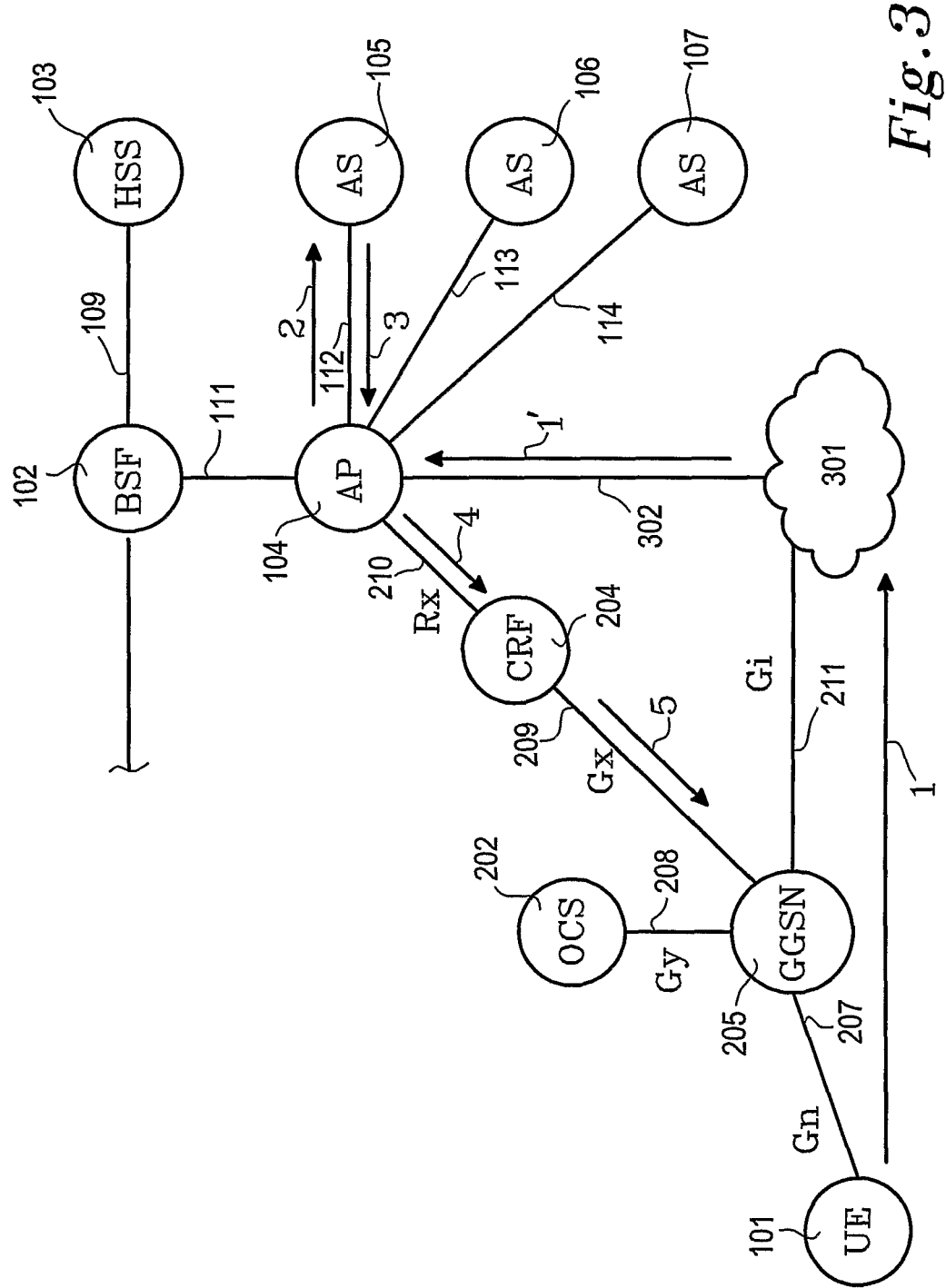
FIG. 3 shows a schematic block diagram over the integrated GAA and FBC method according to the present invention.

One preferred embodiment of the present invention is illustrated in FIG. 3 which shows a schematic block diagram of the involved nodes and signaling sequence between involved nodes in an integrated architecture in one preferred embodiment with a combination of FBC and GAA.

The new integrated architecture is shown in FIG. 3. The Rx reference point is provided by an interface 210 between the Authentication Proxy 104, defined in GAA, and to the Charging Rules Function (CRF) 204, communication is then forwarded further by the interface 112, 113, and 114 between the AP and the AS 105, 106, and 107. This signaling ensures that IP Flow information is possible to provide from the Service Layer down to the Network layer, and that the information is tied to a specific user, which is authenticated by the AP 104. The AP 104 ensures that the information is not only bound to the UE 101 IP address (which can easily be faked) but also to the UE authenticated IMSI, thus ensuring the authentication of the user on an infrastructure level.

If the AP 104 is not involved, e.g. if the AS 105, 106, and 107 provide filtering information directly to the CRF 204, there could only be a user identification based on IP address and not on IMSI, since the AS 105, 106, and 107, in some cases being an ordinary server on the Internet 301, AS 105, 106, and 107 does only have access to the users IP address.

The present invention ensures that there is a binding between the authenticated user 101 and the charging rules provided for that specific user 101.

FIG. 3 shows a typical signaling sequence:
1. The UE 101 authenticates to the AP 104 according to the GAA method
2. The UE 101 signals to the AS 105, 106, and 107 to access the service provided by the AS 105, 106, and 107
3. The AS 105, 106, and 107 evaluates the user. It may be e.g. that this user 101 is identified as belonging to a segment that should be targeted with this new service. In case a special offer is available for this user, user specific charging rules (filters and charging method, e.g. zero rating indication, validity period . . . ) are sent back to the AP 104.
4. The AP 104 sends the user specific charging rules to the CRF 204.
5. The CRF 204 forwards the user specific charging rules/filter down to be used by the TPF in the GGSN 205. And in case of e.g. user specific zero rating, the GGSN 205 can let the filtered traffic for this user pass free of charge. The offer may also be e.g. that a volume of e.g. 10 Mbytes of service is for free, or access to the service the first N times is free of charge, or free access for X hours.

The preferred embodiment of "combined" FBC and GAA signaling method reduces the risk that a user can fake his ID or IP address towards an application server (AS) 105, 106, and 107 and obtaining services at an incorrect charging rate.

In a similar fashion, the present invention suggests a combination of PDF and GAA, enabling user and application specific policy decisions to taken. This allows the system to differentiate the bearer policies depending on services required, such as Quality of Service level depending on user and application. For example, a power user paying extra for high speed access may during a session of streaming video obtain an increased Quality of Service level. In order to reduce the risk of someone erroneous acquiring a higher QoS, the system authentication of the user may be made available for the specific application. The application may be both an application provided by the network provider and it may be an application provided by a third party service provider. The present invention ensures that the authenticated user is the correct user with access to for user specific services for all applications trusting the network provider/operator.

Many different user service configurations may be utilized and many different application situations may be combined in this scheme.

The present invention also ensures that 3GPP level user authentication is applied also for external or internal applications serviced to the user and the invention guarantees that only the intended user can access the requested service, e.g. only the correct user should get access and pay for services requested, obtain a certain level of Quality of Service (QoS), or similar user/service bindings.

The present invention is applicable independent whether the user is an individual user that accesses a service using an individual IP address or is part of an MBMS (Multimedia Broadcast Multicast Service) session using an IP multicast address.

It should be understood by the person skilled in the art that different service functions may be used alone or in combination with each other; the above exemplified embodiments may for instance be combined in transactions where special charging rules apply for a certain QoS session, binding charging filters and policy decisions with different application servers.

The specific Application Server used in the transaction may be a publicly available server for instance located on the Internet or it may be a server provided by the network provider/operator handling the physical or virtual network. In one preferred embodiment of the present invention the AS 105, 106, and 107 is located on an IP network infrastructure. However, it is to be understood by the person skilled in the art, that other network architectures may be possible, such as, but not limited to, an X25 network.

The present invention opens up for new, interesting, and more efficient business models for network providers/operators. For instance the operators may offer a sought after Single Sign On service and can possible charge for this value adding service towards users and/or application service providers. Other business opportunities that may be facilitated with the present invention is VoIP (Voice over IP) solutions where two or more users (UE) located within the same network will use VoIP services to communicate with each other. In this case the system will setup the correct QoS level and/or charging rules while authenticating the users and ensuring that the correct parties will be charged and a correct amount.

These new business models may also be exemplified by, but not limited to, user specific charging models such as allowing a certain amount of traffic for free and at a user specified limit additional traffic starts to cost money. It can also be configured in such a way that the first N times a specific user accesses a specific service it is for free. In a similar fashion a user may have a specific QoS level when using a specific service for a certain number of times and/or for a specific cost. Many different combinations and business models may be utilized from the present invention and as is exemplified above several different offerings or rules are available:
a time offer, wherein the application service is available for a specific time;
a cost offer, wherein the application service is available for a specific cost;
a number offer, wherein the application service is available a specific number of times; and
a QoS offer, wherein the application service is available with a specific QoS level.

These offerings may be combined and/or dynamically changed depending on predetermined criteria. For instance regarding a cost offering or rule, a user may get the first 10 MB of traffic per month for free, the next 10 MB at a specific cost, and the next 10 MB at another cost and so on. The same also applies to the other offering examples. Other types of offering or rules may also be available as should be appreciated by the person skilled in the art.

The system can also handle different events using authenticated service filters, such as for charging filters, an event may be for instance that a user has used up his or hers free MB transfer rate for the month and a new charging rule should be set up dynamically during the session.

One of the main advantages with the present invention is that it will be much more difficult for network fraud since the basic infrastructure network itself ensures the authenticity of the user towards application servers (both external third party and internal operator specific servers), using built in communication network functions and unique ID credentials such as the well proven standard IMSI system. The present invention is especially applicable for dynamical and/or individual charging rates or QoS level access when accessing applications servers.

Figure 4:
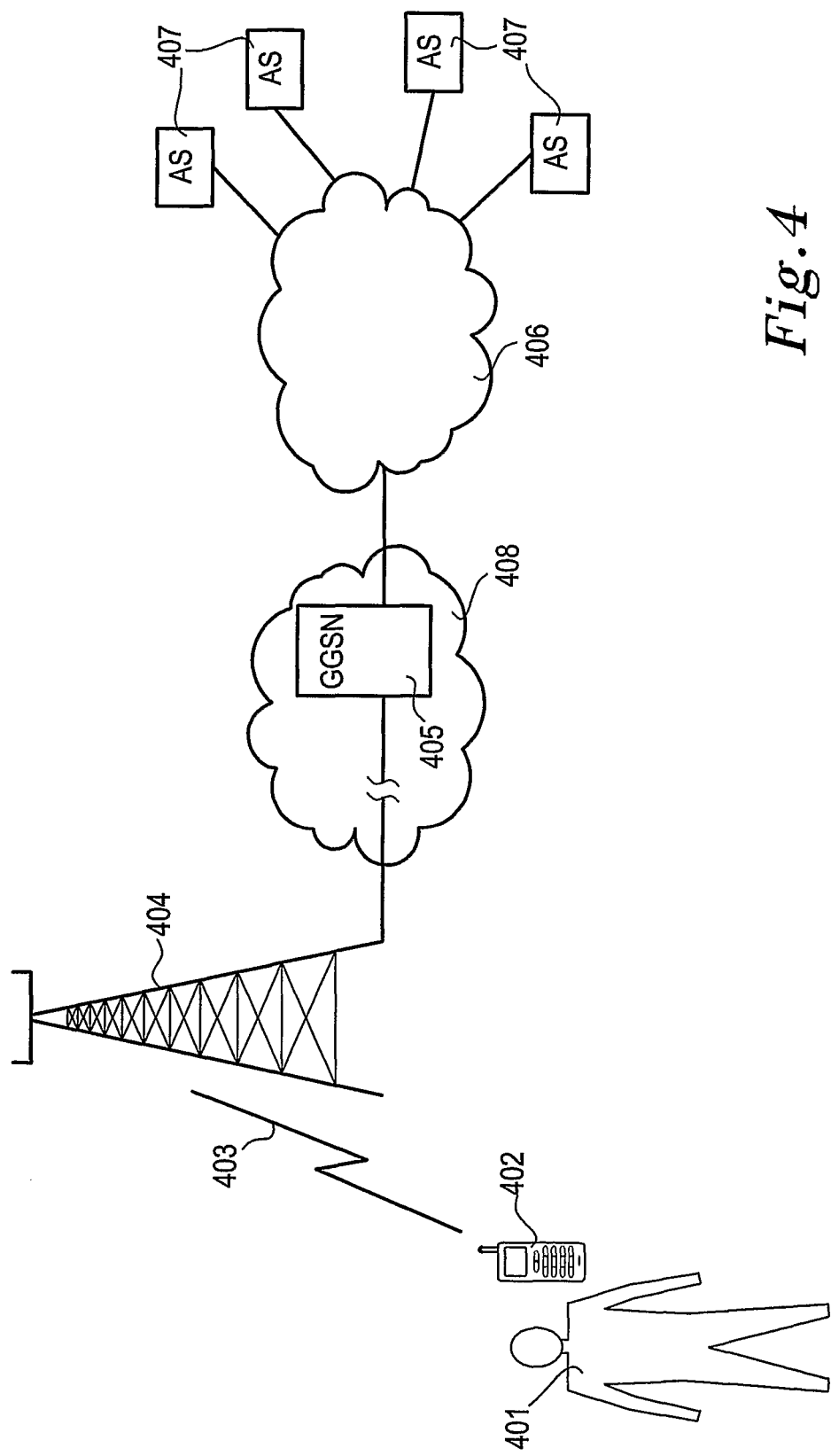
FIG. 4 illustrates a schematic view of a network setup according to 3GPP standards.

FIG. 4 schematically illustrates the basic topology of a 3GPP network. A user 401 connects to the communication infrastructure using a handset 402 often referred to as a user equipment (UE). An IP request from the user 401 is transferred via the network infrastructure 408 and especially through a GGSN node 405 to an application server 407 (AS) via for instance an external IP network 406, such as the Internet.

All the above mentioned functions and methods may be implemented in software as instruction sets in a memory of one or several computational devices comprising at least one memory unit, processing unit, communication unit, and other optional units as may be found in computers or embedded computer application devices.

It should be understood by the person skilled in the art that other authentication functions may be used, for instance the present invention is not limited to the use of the IMSI system, but that other unique identification credentials may be used.

It should also be understood by the person skilled in the art that the above mentioned embodiments has been illustrated for a 3GPP network but the same concepts may be applicable to other packet based wireless communication networks.

Although the invention has been described in detail for the purpose of illustration, it is to be understood that such detail is solely for that purpose and that variations can be made therein by those skilled in the art without departing from the spirit and scope of the invention except as it may be limited by the following claims.

The invention claimed is:

1. A method for binding service functions in a telecommunication network to an authentication function, wherein said method comprises steps of:
   receiving a user Internet Protocol (IP) number related to a user equipment at an authentication service;
   authenticating said user equipment according to a Generic Authentication Architecture (GAA) method in said authentication service, wherein the GAA method includes:
      sending a user identification number from the user equipment to a bootstrap function;
      sending the user identification number from the bootstrap function to a home subscriber system;
      providing an authentication vector from the home subscriber system to the bootstrap function:
      authenticating, the user equipment at the bootstrap function:
      sending a transaction identifier from the bootstrap function to the user equipment:
      sending at least the transaction identifier and the user identification number from the bootstrap function to the authentication service and an application server;
      sending at least the transaction identifier and the user identification number from the user equipment to the authentication service;
   sending authentication data from said authentication service to an application server requested by said user equipment;
   receiving user specific charging rules for a user of said user equipment from the application server at said authentication service;
   sending at least the user specific charging rules for said user to a communication support node via said authentication service and a service rules function;
   wherein said communication support node is a Gateway General Packet Radio Service Support Node (GGSN); and,
   wherein said service rules function comprise a Charging Rules Function (CRF); and
   ensuring, at the authentication service, that information sent from the application server is tied to the user equipment by:
      ensuring that the information is bound to both the user IP number and the user identification number:
      wherein the user equipment communicates with the authentication service during the GAA method:
      wherein the authentication service is interfaced with the CRF which is interfaced with the GGSN which is interfaced with the user equipment: and
      wherein the authentication service is interfaced with the application server.

2. The method according to claim 1, wherein said user identification number is an International Mobile Station Identity (IMSI) number.

3. The method according to claim 1, wherein said authentication service is an Authentication Proxy (AP).

4. The method according to claim 1, wherein said service rules function further comprise user specific policy control rules associated with a Policy Decision Function (PDF).

5. The method according to claim 1, wherein a user is an individual user or part of an MBMS (Multimedia Broadcast Multicast Service) session using an Internet Protocol (IP) multicast address.

* * * * *